United States Patent Office 3,159,477
Patented Dec. 1, 1964

3,159,477
PROCESS FOR PRODUCING ACIDIC SOIL CONDITIONER CONTAINING CHELATED PLANT NUTRIENTS
Harold W. Wilson, P.O. Box 1101, El Paso, Tex.
No Drawing. Filed Oct. 30, 1961, Ser. No. 148,707
1 Claim. (Cl. 71—62)

This application is a continuation-in-part of application Serial No. 29,130, filed on May 16, 1960.

This invention relates to the production of a fertilizing material for calcareous (alkaline) soils and it has for its special object the provision of a fertilizing material in such form: (1) that the product is not used up or decomposed immediately after being taken into the soil, (2) that the plant nutrients contained therein are released slowly for use of plants growing in the soil, and (3) that the product is non-toxic and beneficial to the soil in more than one manner insofar as it will not merely neutralize alkalinity of the soil because of its acid character, but will add other beneficial results to the one mentioned.

This invention also relates to the product itself which is an acidic soil conditioner containing chelated plant nutrients. Moreover, said product is low in cost and is easily applied when used in conventional distribution equipment.

The invention is based on the discovery that slags from a reverberatory copper refining process, when treated with acids, such as sulfuric and phosphoric acid or with a mixture of said acids, in the presence of water, yield a product which has essentially the qualities above enumerated. If chemical fertilizers are premixed with the slag prior to addition of aqueous acid solutions, the products will contain all those plant nutrients which have been added to the slag in their most effective state. In addition, when the plant nutrient, e.g., ethylene diaminetetraacetic acid, diethylene triaminepentaacetic acid, is one which forms in situ "metallic chelates" with metals, e.g., iron, copper, manganese, zinc, calcium, magnesium, molybdenum, of the slag in the presence of an aqueous mineral acid, e.g., sulfuric acid, phosphoric acid, the product has a far greater beneficial action than the corresponding product in the absence of chelated metals.

It has already been proposed to use slag derived from an iron refining process as a fertilizer and to treat the slag with just enough dilute acid to dissolve it, so that it can produce plant nutrients, when added to the soil. Further it has been proposed to use very dilute acid solutions in connection with slag derived from an iron refining process in order to dissolve silicic acid and to eliminate gel formation. These proposals provide however for only minor amounts of plant nutrients which are of benefit for a very short time.

United States Patent 2,927,851 describes the formation of a solid, dry, gelatinous silicate soil-improving and soil-fertilizing product when slag obtained from the process of refining copper ore in a reverberatory furnace is treated with concentrated acids selected from the group consisting of sulfuric acid (having a strength of at least 90%) and phosphoric acid (having a strength greater than 70%) and where water is present with the slag prior to the addition of the concentrated acid, the weight of such water being at most the combined weight of the slag and the acid used. In the reaction the solid, hydrated siliceous gelatinous product is produced within less than a few minutes after the addition of the concentrated acid and some of the water is evolved from the mixture as a consequence of the exothermic reaction which is produced by bringing said acid together with said slag in the presence of the limited amount of water. Also, water soluble plant nutrients may be dissolved in the water in the above described process before the addition of acid to form a product containing such plant nutrients as part of its total composition.

The present invention also relates to solid, dry gelatinous hydrous silicate soil-improving and soil-fertilizing products. The products of this invention are formed by treating pulverized slag, obtained from the process of refining copper ore in a reverberatory furnace, and metal chelate forming plant nutrient, e.g., ethylene diaminetetraacetic acid, diethylene triaminepentaacetic acid, with a hot aqueous solution of sulfuric and/or phosphoric acids, said pulverized slag being of a fineness of from about 100 mesh (U.S. Standard Sieve) to about 200 mesh or finer. The instant invention encompasses the mechanical mixing of dry pulverized slag with dry, water-soluble metal chelate forming plant nutrients prior to the treatment of the resulting mixture with a hot aqueous solution of sulfuric and/or phosphoric acid.

By the use of sulfuric and/or phosphoric acid, water and heat, water-insoluble slag is converted into a hydrated, solid gel containing within a hydrophilic colloid structure the following named substances: the hydrates of ferrous sulfate, ferrous sulfato acid, calcium and magnesium sulfates, unreacted sulfuric acid combined physically with ferrous sulfate, the gels of silicic acid and aluminum oxide, and trace amounts of other metallic sulfates and oxides derived from the reaction between the metallic elements, i.e., zinc, copper, manganese, boron, and molybdenum, usually found associated with ores from which the slag was derived and sulfuric acid used in the process. When phosphoric acid is employed, in place of sulfate, sulfuric acid derivatives and free sulfuric acid, the resulting product contains hydrates of acid ferrophosphate, calcium and magnesium phosphates, phosphoric acid, and metallic oxides and phosphates of the metallic compounds noted above enveloped in the same type of hydrophilic colloid structure derived by acid hydrolysis of the silicates of the slag and condensation of the silicic acid and aluminum oxide formed in the reaction. In the embodiment of this invention wherein mixtures of sulfuric acid and phosphoric acid are employed, water-insoluble slag is converted into the hydrophilic colloid structure containing mixtures of corresponding metal phosphates and sulfates, oxides, and unreacted acids. The metal chelate forming nutrient not only provides a source of the primary plant nutrient, nitrogen, but, far more significantly forms metal chelates in situ with metals of the slag in the presence of aqueous acid, i.e., sulfuric acid, phosphoric acid, a mixture of sulfuric and phosphoric acids. The formed "metallic chelates" of iron, copper, manganese, zinc, calcium, magnesium and molybdenum are bound with non-chelated metals of the same group in the siliceous gel structure.

The products made by this invention, by use of the materials noted above, are as useful in each and every manner as are the products produced under the processes disclosed in the Wilson patent, No. 2,927,851. The products of this invention, when applied to calcareous soils, will not only effect a reduction of soil alkalinity of such treated soils, but will also reduce evaporation-of-water losses from such treated soils and will also reduce transpiration losses from plants growing in such treated soils. In addition, the use of these products will induce soil granulation and enhance soil structures of calcareous soils treated with such products. The gel structure of the products with its high adsorptive qualities holds all the materials which are contained in the mass and which are to be given up to the soil in a state of readiness for slow liberation through progressive decomposition. This also applies to the plant nutrients which may have been added to the slag. Tests conducted with such a product to which such plant nutrients have been added show that only part of these plant nutrients are immediately available while the remainder are available only over extended periods. In the end however 100% of the nutrients are given up to the soil. The presence of the above-noted chelated metals in the resultant product causes said product to have a far more beneficial action than the product formed without chelated metals. The beneficial action referred to is known in modern agricultural practices, but the instant preparation of "chelated metals" and the manner in which the "chelated metals" exist in said product are totally different from that formerly known.

The slag, as indicated supra, is obtained from the reverberatory refining of copper. An appreciation of the chemical nature of this slag necessitates understanding of metallurgical processes entailed in the reverberatory refining of copper ore. As most ores subjected to this process are pyritic (sulfide containing) and for the greater part are chalcopyrite—$CuFeS_2$, the slag from their refining contains a large percentage of iron as metallic, as siliceous, and as oxide ($Fe_3O_4$) in addition to the metal oxides and silicates of aluminum, calcium, magnesium, zinc, manganese, lead, copper, boron, and molybdenum. Typical analysis of such slag would be as follows: silicon dioxide—approximately 30%; iron (expressed as metallic)—15% to 35%; calcium, aluminum, magnesium, and manganese (expressed as oxides—total approximately 16% to 22%; sulfur (as elemental sulfur)—approximately 1%; combined oxygen—approximately 7%; zinc, copper, lead, boron, molybdenum (expressed as metallic)—approximately 2% to 4%; said percentages being by weight.

The slag described above exerts strong magnetic properties. Studies have shown the iron content to be present as a combination of iron metal, magnetic iron oxide, and some FeO. The copper slag is cooled in different ways in the refineries. Some copper refineries cool the slag by mixing it with water which produces a very rapid cooling or quenching. The slag of the reverberatory copper refining process may thus be a quenched or a non-quenched slag. The use of quenched or rapidly cooled slag results in a much more rapid reaction during acid treatment.

The physical states of the products obtained by means of quenched or water-cooled slags and non-quenched or air-cooled slags are different, although a chemical analysis of the gel shows no difference. When quenched slag is used, the product forms a light fluffy material. An air-cooled slag however reacts with the acid to produce a more granular product which is compact and for some uses is preferable.

The acid solution employed is an aqueous solution of sulfuric acid, phosphoric acid, or a combination of these acids, the acid concentration ranging from 35% to 70% with the balance being water.

Examples of plant nutrients which form metal chelates, in the presence of above-noted acids, with slag from the reverberatory refining of copper are, e.g., acetic acid products, such as ethylene diaminetetraacetic acid and diethylene triaminepentaacetic acid. Were either of said acetic acid products introduced in the process of the Wilson patent, No. 2,927,851, the concentrated acid (either sulfuric and/or phosphoric acid) would decompose it, thus precluding the presence of said acetic acid products either in the state as introduced or as metal chelates. The metal chelate preparation is dependent upon the plant nutrient, the use of dilute aqueous acid and controlled temperature. The chelating property in fact so overshadows the value as a plant nutrient that acetic acid derivatives of amines and amino alcohols are employed primarily for their value as chelating agents and not because of their nitrogen (plant nutrient containing) content even though said nitrogen would be available as a plant nutrient.

Mineral and acetic acid salts of secondary and tertiary amines and amino alcohols may be employed (in the same manner as the above-noted acetic acid products) as chelating agents for the chelation of metals and metallic salts in the reaction between (a) slag, (b) mineral acids (sulfuric and phosphoric) and (c) water to produce chelated metals in the resulting product. The amount of chelating agent (amine or amino alcohol) employed is a function of the amount and degree of metal chelation desired plus the permissible cost and selling value of the product obtained.

Exemplary acetic acid amines are: ethylene diaminetetraacetic acid and diethylene triaminepentaacetic acid (preferred embodiments), trimethylene diaminetetraacetic acid and tetramethyldiaminetetraacetic acid.

Exemplary acetic acid amino alcohols, are: diethanolamine acetic acid and triethanolamine acetic acid.

Mineral acid salts of corresponding amines and amino alcohols can be employed in the same manner with comparable results. Said salts can be prepared with any mineral acid, e.g., hydrochloric acid, sulfuric acid and phosphoric acid. Examples are: ethylene diamine hydrosulfate, diethanolamine hydrochloride, diethylene triamine phosphoric acid, diethylenetriamine hydrochloride, triethanolamine phosphoric acid, diethanolamine sulfuric acid.

In the preparation of the products of the present invention, the ratio of slag/water/acid is important, and the temperature at which the slag is brought into contact (treated) with the acid-water mixture cannot exceed 310° F. Although a range from 240° to 300° F. is easily employed, from 260° to 280° F. is most practical. The resulting products contain a maximum of condensed hydrophilic gel (from silicic acid) with maximum molecular branch structure. Moreover, the level of water of hydration and the level of energy of activation are directly affected by the concentration of hydrogen ions and ionizable water in the system.

The concentration of acid in the aqueous acid solution, i.e., water and acid, ranges from 35 to 70% (by weight) for sulfuric acid and from 35 to 66% (by weight) for phosphoric acid. A good working range for sulfuric acid is from 55 to 66%, but from 58 to 62% is preferred and a concentration of 60% sulfuric acid in the slag/acid mixture is optimal. For phosphoric acid a good working range is from 60 to 65%, from 62 to 64% being preferred and a concentration in slag/acid mixture of 63% phosphoric acid being optimal. Combinations of both phosphoric and sulfuric acids with water and slag to give acid concentrations within the above-indicated ranges are also within the purview of the instant invention. The temperature at which the slag is contacted with the aqueous acid solution is optimally in the vicinity of 275° F. for all concentrations of acids within the indicated ranges.

The weight ratio of slag/acid/water includes ratios of 10/(4 to 5)/(6 to 10) when sulfuric acid is employed and of 10/(3 to 4)/(5 to 7) when phosphoric acid is employed. A weight ratio of 10/5/7 is preferred for sulfuric acid, whereas a weight ratio of 10/3/5 is preferred when phosphoric acid is employed. When the acid concentration exceeds that of the slag and is increased above the optimum, the reaction tends to be incomplete; and although some gel forms, such gel fails to trap and embody all of the acid used, thus resulting in a product which is wet with excess acid and which will not dry even when subjected to elevated temperatures. On the other hand when the concentration of acid in the solution used drops below 35%, the rate of gel formation is lower, and a time period of about 5 minutes is required for gelation to take place.

To facilitate the preparation of the soil conditioners, it is well to use finely divided slag. At least 70% of the slag must pass a 200 mesh U.S. Standard Sieve and the optimum is to have 90% of the slag finer than 200 mesh. In practice, however, having at least 75% finer than 200 mesh is most practical, but from 80 to 90% finer than 200 mesh is preferred.

The cost of the chelating agent provides the critical upper limit to its concentration in the soil conditioner. Although from about 1% to about 20% (by weight based on the total of slag, water and mineral acid) chelating agent is practical, a 10% concentration is preferred and from 1 to 10% is ordinarily employed.

In the preparation of the soil conditioners according to this invention the thorough admixture (tumbling is preferred) of dry slag with dry chelating agent is essential for maximum chemical reactivity between the chelating agent and the soluble metal salts; the highest percentage of chelated metal is thus obtained.

To provide a standard of comparison, with the ethylenediamine tetraacetic acid agent about 1¼ pounds of metallic iron are chelated by use of about 10 pounds of said agent whether the iron is present in the soil conditioner or in the soil, as long as it is in the presence of moisture and iron. However, when the pH is over 7.5, the ability of chelating agent to react with metals in the soil is greatly reduced; in the presence of the acid of said soil conditioner the chelating agent is active up past a pH of 9.0. Chelation products made from wood pulp (lignin-containing agents) and those made from citric acid (citrates) are readily decomposed by soil microorganisms and very rapidly, whereas synthetic complexes in the chelated soil conditioner of this invention resist microorganism destruction 100%. Other synthetic chelating agents made by mixing soluble salts of metals with liquid solutions of chelating agents, such as that obtained by mixing iron sulfate with ethylenediamine tetra sodium salt in water, are not acidic in nature and have no free mineral acid to react with alkaline soil to prolong and enhance total chelating action and to maintain reserve chelation power to provide continuing availability of micronutrient metals of the chelation-soil system. Also, both synthetic and natural metal chelates are highly water soluble and are readily and quickly leached from the soil while those in the chelated soil conditioner follow the same pattern as non-chelated soil conditioner in that the gel structure permits slow release and thus prolonged availability of the metal (micro nutrients) with retarded movement (leachability) through the soil beyond the reach of the plant roots.

It is further noteworthy that chelation of a plurality of metals essential for plant growth is concurrently brought about by the acidic soil conditions of this invention.

In the following illustrative examples the parts and percentages are by weight unless otherwise specified. All steps are effected at atmospheric pressure and normal room temperature unless otherwise specified.

Example 1

In a dry state 50 parts of pulverized (90% passing a 200 mesh U.S. Std. Sieve) slag (obtained from the process of refining copper ore in a reverberatory furnace) are thoroughly mixed by tumbling with 10 parts of ethylenediaminetetraacetic acid. A solution of 25 parts of water and 35 parts of 98% sulfuric acid is heated to a temperature of 260° F. and stirred into the above-formed dry admixture.

Example 2

In a dry state 50 parts of pulverized (90% passing a 200 mesh U.S. Std. Sieve) slag (obtained from the process of refining copper ore in a reverberatory furnace) are thoroughly mixed by tumbling with 10 parts of diethylenetriaminepentaacetic acid. 60 parts of a 58% aqueous sulfuric acid solution are heated to a temperature of 260° F. and stirred into the above-formed dry admixture.

Example 3

A solution composed of 20 parts of water and 35 parts of 98% sulfuric acid is heated to 280° F. and poured onto a dry admixture of (a) 50 parts of pulverized (90% passing a 200 mesh U.S. Std. Sieve) reverberatory furnace copper refining slag with (b) 20 parts of ethylenediaminetetraacetic acid. During the pouring the admixture is continually stirred.

Example 4

55 parts of a 63% aqueous sulfuric acid solution are heated to 280° F. and poured onto a dry admixture of (a) 50 parts of pulverized (90% passing a 200 mesh U.S. Std. Sieve) reverberatory furnace copper refining slag with (b) 20 parts of diethylenetriaminepentaacetic acid. During the pouring the admixture is continually stirred.

Example 5

A solution composed of 31 parts of 85% ortho-phosphoric acid and 5 parts of water is heated to 245° F. and then stirred into a thorough admixture of (a) 50 parts of pulverized (85% passing a 200 mesh U.S. Std. Sieve) reverberatory furnace copper refining slag and (b) 10 parts of ethylenediaminetetraacetic acid.

Example 6

A solution composed of 31 parts of 85% ortho-phosphoric acid and 5 parts of water is heated to 245° F. and then stirred into a thorough admixture of (a) 50 parts of pulverized (85% passing a 200 mesh U.S. Std. Sieve) reverberatory furnace copper refining slag and (b) 10 parts of diethylenetriaminepentaacetic acid.

In each of the preceding examples the product becomes a solid gel within 30 to 60 seconds after all of the acid is combined with the admixture of slag and chelating agent. Said product contains chelated metallic micro and secondary plant nutrients as well as nitrogen. Where phosphoric acid is employed, it too is available (see Examples 5 and 6). In the following examples comparable products are obtained. The products of all examples are acidic soil conditioners having chelated essential metals and plant nutrient.

Example 7

36 parts of a 63% aqueous ortho-phosphoric acid solution are heated to 275° F. and then stirred into a thorough admixture of (a) 50 parts of pulverized (85% passing a 200 mesh U.S. Std. Sieve) reverberatory furnace copper refining slag and (b) 10 parts of trimethylene diaminetetraacetic acid.

Example 8

In a dry state 41 parts of pulverized (80% passing a 200 mesh U.S. Std. Sieve) slag (obtained from the process of refining copper ore in a reverberatory furnace) are thoroughly mixed by tumbling with 10 parts of tetramethyldiaminetetraacetic acid. 49.2 parts of a 58% aqueous sulfuric acid solution are heated to a temperature of 275° F. and stirred into the above-formed dry admixture.

Example 9

In a dry state 50 parts of pulverized (90% passing a 20 mesh U.S. Std. Sieve) slag (obtained from the process of refining copper ore in a reverberatory furnace) are thoroughly mixed by tumbling with 10 parts of diethanolamine acetic acid. A solution of 25 parts of water and 35 parts of 98% sulfuric acid is heated to a temperature of 260° F. and stirred into the above-formed dry admixture.

Example 10

In a dry state 50 parts of pulverized (90% passing a 20 mesh U.S. Std. Sieve) slag (obtained from the process of refining copper ore in a reverberatory furnace) are thoroughly mixed by tumbling with 10 parts of triethanolamine acetic acid. 60 parts of a 58% aqueous sulfuric acid solution are heated to a temperature of 260° F. and stirred into the above-formed dry admixture.

Example 11

A solution composed of 20 parts of water and 35 parts of 98% sulfuric acid is heated to 280° F. and poured onto a dry admixture of (a) 50 parts of pulverized (90% passing a 200 mesh U.S. Std. Sieve) reverberatory furnace copper refining slag with (b) 20 parts of diethanolamine sulfuric acid. During the pouring the admixture is continually stirred.

Example 12

55 parts of a 63% aqueous sulfuric acid solution are heated to 280° F. and poured onto a dry admixture of (a) 50 parts of pulverized (90% passing a 200 mesh U.S. Std. Sieve) reverberatory furnace copper refining slag with (b) 20 parts of triethanolamine phosphoric acid. During the pouring the admixture is continually stirred.

Example 13

A solution composed of 31 parts of 85% ortho-phosphoric acid and 5 parts of water is heated to 245° F. and then stirred into a thorough admixture of (a) 50 parts of pulverized (85% passing a 200 mesh U.S. Std. Sieve) reverberatory furnace copper refining slag and (b) 10 parts of diethylenetriamine hydrochloride.

Example 14

A solution composed of 31 parts of 85% ortho-phosphoric acid and 5 parts of water is heated to 245° F. and then stirred into a thorough admixture of (a) 50 parts of pulverized (85% passing a 200 mesh U.S. Std. Sieve) reverberatory furnace copper refining slag and (b) 10 parts of diethylenetriamine phosphoric acid.

Example 15

36 parts of a 63% aqueous ortho-phosphoric acid solution are heated to 275° F. and then stirred into a thorough admixture of (a) 50 parts of pulverized (85% passing a 200 mesh U.S. Std. Sieve) reverberatory furnace copper refining slag and (b) 10 parts of diethanolamine hydrochloride.

Example 16

In a dry state 41 parts of pulverized (80% passing a 200 mesh U.S. Std. Sieve) slag (obtained from the process of refining copper ore in a reverberatory furnace) are thoroughly mixed by tumbling with 10 parts of ethylene diamine hydrosulfate. 49.2 parts of a 58% aqueous sulfuric acid solution are heated to a temperature of 275° F. and stirred into the above-formed dry admixture.

The products of this invention reduce loss of moisture from soils by evaporation and reduce plant transpiration losses when said products are used in the treatment of calcareous soils in which the plants are growing. The ability of these products to effect cementation of soil particles and their ability to hold adsorbed moisture with great tenacity against the vapor pressure gradient enable them to act as moisture reservoirs when present in the soil. The gradual release of this moisture from the colloidal entities of the hydrophilic system affords a continuous water supply both in the soil proper and to supply the needs of plants which otherwise would be subject to wilt caused by the inability of untreated soil to have a moisture reserve.

Although the nitrogen of the amines and amino alcohols employed for preparing the soil conditioners of this invention is available as a plant nutrient, this is minor in comparison with the metal chelating value of said amines and amino alcohols.

It is thought that the invention and its advantages will be understood from the foregoing description, and it is apparent that various changes may be made in the process and the products without departing from the spirit and scope of the invention or sacrificing its material advantages, the process and the products, hereinbefore described, being merely illustrative of preferred embodiments of the invention.

Having described the invention, what is claimed is:

A process which comprises (1) intimately admixing while dry (a) finely divided reverberatory copper refining slag having a typical analysis comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum, at least 70 percent by weight of which slag passes a 200 mesh U.S. Standard Sieve, and (b), an amine selected from the group consisting of acetic acid amine, acetic acid alkanolamine, amine mineral acid addition salt and alkanolamine mineral acid addition salt and (2) stirring into the intimate slag/amine admixture an aqueous mineral acid solution having a temperature of from 240° to 300° F. and selected from the group consisting of (a) sulfuric acid having a concentration in water of from 55 to 66 percent by weight, (b) phosphoric acid having a concentration in water of from 60 to 65 percent by weight and (c) a mixture of said aqueous sulfuric acid solution and said phosphoric acid solution; the slag/water/(mineral acid) weight ratio being within the range of 10/(3 to 5)/(5 to 8); and the amount of the amine being from about 1 to about 20 percent by weight of the total of slag, mineral acid and water.

References Cited in the file of this patent

UNITED STATES PATENTS

| 238,240 | Lippincott | Mar. 1, 1881 |
|---|---|---|
| 2,288,874 | Anderson | July 7, 1942 |
| 2,532,548 | Heide | Dec. 5, 1950 |
| 2,828,182 | Cheronis | Mar. 25, 1958 |
| 2,833,640 | Bersworth | May 6, 1958 |
| 2,927,851 | Wilson | Mar. 8, 1960 |